(12) United States Patent
Buckley et al.

(10) Patent No.: US 12,699,687 B2
(45) Date of Patent: Aug. 4, 2026

(54) METHOD AND SYSTEM FOR PERFORMING AUTOMATED DATABASE UPDATES

(71) Applicant: Siemens Aktiengesellschaft, Munich (DE)

(72) Inventors: Mark Buckley, Munich (DE); Ekaterina Staroverova, Prague (CZ); Joao Aguiar Jorge da Silva, Lisbon (PT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/588,252

(22) Filed: Feb. 27, 2024

(65) Prior Publication Data

US 2025/0036615 A1     Jan. 30, 2025

(30) Foreign Application Priority Data

Feb. 28, 2023    (EP) ..................................... 23159018

(51) Int. Cl.
G06F 16/23          (2019.01)
G06F 16/2452       (2019.01)
(Continued)

(52) U.S. Cl.
CPC ........ G06F 16/2379 (2019.01); G06F 40/295 (2020.01)

(58) Field of Classification Search
CPC ............... G06F 16/2379; G06F 40/295; G06F 16/24522; G06F 16/258; G06F 16/23; G06F 16/288; G06N 3/0442; G06N 3/08
See application file for complete search history.

(56) References Cited

U.S. PATENT DOCUMENTS

2002/0156817 A1    10/2002  Lemus
2009/0249182 A1*   10/2009  Symington ........... G06F 40/295
                                                                    715/209

(Continued)

FOREIGN PATENT DOCUMENTS

AU        2021200862  A1     9/2021
EP         3920044  A1    12/2021

*Primary Examiner* — Charles Rones
*Assistant Examiner* — Mohammad S Bhuyan
(74) *Attorney, Agent, or Firm* — Schmeiser Olsen PLLC

(57)          ABSTRACT

To perform automated database updates, a text document is processed by a natural language processing engine, by way of tagging, by a pre-trained general named entity recognition annotation model and/or at least one domain-specific named entity recognition component, tokens in the text document with named entity recognition annotations. A neural network model processing the tokens and the named entity recognition annotations extracts a database update action from the text document and stores the database update action as structured data in a machine-readable form, which is then sent to a robotic process automation interface and executed by updating a database. This provides an extensible neural architecture for extracting and executing operational actions from text documents. Combining the use of annotated data with a neural network model is more flexible because it allows variations in the exact formulation which is used in the text document to express the database update action.

8 Claims, 6 Drawing Sheets

(51) Int. Cl.

| | | |
|---|---|---|
| *G06F 16/25* | (2019.01) | |
| *G06F 16/28* | (2019.01) | |
| *G06F 40/295* | (2020.01) | |
| *G06N 3/0442* | (2023.01) | |
| *G06N 3/08* | (2023.01) | |

(56) References Cited

U.S. PATENT DOCUMENTS

| | | | |
|---|---|---|---|
| 2009/0319257 A1* | 12/2009 | Blume | G06F 40/55 |
| | | | 704/7 |
| 2015/0363688 A1* | 12/2015 | Gao | G06N 3/045 |
| | | | 706/27 |
| 2018/0107734 A1* | 4/2018 | Galia | G06Q 40/08 |
| 2018/0336198 A1 | 11/2018 | Zhong et al. | |
| 2020/0090033 A1* | 3/2020 | Ramachandran | |
| | | | G06F 16/24522 |
| 2020/0111023 A1* | 4/2020 | Pondicherry Murugappan | |
| | | | G06N 5/02 |
| 2020/0223061 A1* | 7/2020 | Han | G06N 3/08 |
| 2020/0234183 A1* | 7/2020 | Ghatage | G06N 20/00 |
| 2021/0090694 A1 | 3/2021 | Colley et al. | |
| 2022/0108106 A1* | 4/2022 | Sathi | G06F 40/00 |
| 2022/0188520 A1* | 6/2022 | Iso-Sipila | G06F 40/295 |
| 2022/0374602 A1* | 11/2022 | Park | G06F 40/295 |
| 2023/0136059 A1* | 5/2023 | Dwivedi | G06F 40/40 |
| | | | 704/9 |
| 2023/0267274 A1* | 8/2023 | Avadhani | G06F 18/22 |
| | | | 704/243 |

* cited by examiner

Xxxxx xxxxx Xxxx,
xxxxx xxxxxxx
Xxxxxxxxxxxxx...

NLPE

NNM

SD

{"orders": [
{"PO": "5025375573",
„Positions": ["all"]
...

RPAI

DB

METHOD AND SYSTEM FOR PERFORMING AUTOMATED DATABASE UPDATES

CROSS-REFERENCE TO RELATED APPLICATIONS

This application claims priority to EP application No. 23159018.3, having a filing date of Feb. 28, 2023, the entire contents of which are hereby incorporated by reference.

FIELD OF TECHNOLOGY

The following relates to a method and system for performing automated database updates.

BACKGROUND

In many fields such as accounting, sales, or procurement, support requests are received from customers in text form, for instance via email or web forms. There is a known, restricted range of actions which these support requests may lead to, but the unrestricted nature of textual input from customers means that the intended actions are usually determined by people who read each request and convert its content into a structured form. For instance, a support request to close a transaction may be expressed as "I hereby confirm delivery of order 123, please close the corresponding transaction" and the intended action could be formalised as "{Action: close; transaction: 123; delivery_status: delivered}".

Customers expect prompt responses and correct execution of their requests; however, the fast growth of the service desk business means that relying on human workers to process every request is a barrier to scalability. Any automated system for handling support requests must be highly accurate, it must be flexible enough to correctly interpret a wide variety of expressions, and it must be tailored to the respective domain of business. For the purposes of scalability, it must be easy to maintain and extend.

Service desk activity is currently a mostly manual task. From the point of view of extracting the intentions and entities which are mentioned in a support request, it is possible to use regular expressions or simple heuristics to recognise concepts in the text. For instance, a serial number in a known format can be reliably extracted with a corresponding regular expression. Using regular expressions is well established for entities such as phone numbers, email addresses or calendar dates. For domain-specific entity types the regular expressions must be developed and tested. Such approaches are precise but require ongoing maintenance as new concepts are introduced. They have limited sensitivity to the natural variation in the expressions which are used by customers to describe their actions.

A typical method for extracting references to known concepts is named entity recognition (NER), a natural language processing method in which a statistical model is used to detect occurrences of known entity types in plain text. Domain-specific NER models are quite effective and can be trained from suitable data, however they do not recognise the intention which is encoded in the support request and therefore only provide part of the necessary technical solution.

SUMMARY

According to embodiments of the method for performing automated database updates, the following operations are performed by components, wherein the components are hardware components and/or software components executed by one or more processors:

receiving, by a network interface, a text document, wherein the text document describes at least one database update action in natural language, processing, by a natural language processing engine, the text document, by way of tagging, by a pre-trained general named entity recognition annotation model and/or at least one domain-specific named entity recognition component, tokens in the text document with named entity recognition annotations, extracting, by a neural network model processing the tokens and the named entity recognition annotations, the database update action from the text document, and storing the database update action as structured data in a machine-readable form, sending the structured data to a robotic process automation interface, and executing the database update action by updating a database.

The system for performing automated database updates comprises:

a network interface, configured for receiving a text document, wherein the text document describes at least one database update action in natural language, a natural language processing engine, configured for processing the text document with a pre-trained general named entity recognition annotation model and/or at least one domain-specific named entity recognition component, configured for tagging tokens in the text document with named entity recognition annotations, a neural network model, trained for extracting the database update action from the text document, by processing the tokens and the named entity recognition annotations, and a memory, accessible for storing the database update action as structured data in a machine-readable form, and a robotic process automation interface, configured for receiving the structured data and executing the database update action in a database.

In connection with embodiments of the invention, unless otherwise stated in the description, the terms "training", "generating", "computer-aided", "calculating", "determining", "reasoning", "retraining" and the like relate for example to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices or any other communication devices that can process data with computer support, processors and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

In embodiments, the method and system, or at least some of their embodiments, provide an extensible neural architecture for extracting and executing operational actions from text documents. Combining the use of annotated data with a neural network model has several advantages, as will be described in the following.

In embodiments, the method and system, or at least some of their embodiments, are more flexible than methods based solely on regular expressions because they allow variations in the exact formulation which is used in the text document to express the database update action. A solution based on regular expressions would need continuous, labour-intensive extension and maintenance to achieve similar results.

The neural network model can be trained from annotated data and requires no rules or heuristics. In case no historical annotated data is available for training, suitable annotations are easy to create (i.e., labelling parts of a set of text documents to highlight the occurrences of relevant entities).

Compared to methods based on heuristics, the use of a machine learning model trained from annotated data means that at least some of the embodiments can capture implicit knowledge about the patterns in the data. The neural network model does not use hard and fast rules but rather takes the full text document into account for each prediction, which is difficult to do with rule-based systems.

In an embodiment of the method, the at least one domain-specific named entity recognition component recognizes and tags tokens in the text document using regular expressions or pre-trained statistical NER models.

In an embodiment of the method, the neural network model computes a confidence value for the database update action. The structured data is sent to the robotic process automation interface only if the confidence value exceeds a given threshold.

According to this embodiment, the neural network model emits confidence values for each of its predictions. This allows potential robotic process automation actions to be stopped if the confidence of the model is too low.

In an embodiment of the method, text document contains at least one anchor. The anchor is a token denoting an entity in the database that the database update action is related to.

In an embodiment of the method, the named entity recognition annotations include at least one anchor annotation, tagging the anchor, and at least one action type annotation, specifying a type of the database update action.

In an embodiment of the method, the neural network model receives as input for each token in the text document a word embedding encoding a meaning of the token, retrieved for the token from a public NLP resource and/or a domain-specific NLP resource, a tag embedding encoding an entity which the token denotes, wherein the tag embedding is based, depending on the token, on the anchor annotation, on the action type annotation, or on another named entity recognition annotation, and a spatial encoding representing how far the token is from the anchor in the text document, measured in a number of tokens.

In an embodiment of the method, the neural network model has a first prediction head, trained for performing an action type prediction predicting an action type for the anchor, by performing a multilabel prediction task with a set number of labels. The predicted action type and the anchor are included in the structured data in order to define the database update action.

In an embodiment of the method, the neural network model has a second prediction head, trained for predicting a location of a phrase relating to the anchor. The phrase relating to the anchor is parsed in order to include its content in the structured data to further define the database update action.

By predicting both atomic types (i.e., the action type) and complex structures (i.e., the phrase relating to the anchor), this embodiment is able to be extended to handle highly structured prediction tasks.

In an embodiment of the method, the neural network model makes the two predictions from a shared document representation which is generated by a single-layer long short-term memory network.

According to this embodiment, the single document representation is used to make multiple predictions for each anchor.

In an embodiment of the method, the neural network model has a third prediction head, trained for predicting a third information relating to the anchor. The third information is included in the structured data to further define the database update action.

According to this embodiment, the neural network model is easily extended to make additional predictions. For instance, the third prediction head could predict an account owner (an entity of type Person).

In an embodiment of the method, the text document contains several anchors. A database update action is extracted and executed for each anchor.

A computer program product (non-transitory computer readable storage medium having instructions, which when executed by a processor, perform actions) comprises instructions which, when the program is executed by a computer, cause the computer to carry out the method.

The provisioning device for the computer program product stores and/or provides the computer program product.

BRIEF DESCRIPTION

Some of the embodiments will be described in detail, with reference to the following figures, wherein like designations denote like members, wherein:

FIG. 4 shows another embodiment;

DETAILED DESCRIPTION

In the following description, various aspects of embodiments of the present invention and embodiments thereof will be described. However, it will be understood by those skilled in the conventional art that embodiments may be practiced with only some or all aspects thereof. For purposes of explanation, specific numbers and configurations are set forth in order to provide a thorough understanding. However, it will also be apparent to those skilled in the conventional art that the embodiments may be practiced without these specific details.

The described components can each be hardware components or software components. For example, a software component can be a software module such as a software library; an individual procedure, subroutine, or function; or, depending on the programming paradigm, any other portion of software code that implements the function of the software component. A combination of hardware components and software components can occur, in particular, if some of the effects according to embodiments of the invention are for example exclusively implemented by special hardware (e.g., a processor in the form of an ASIC or FPGA) and some other part by software.

Figure 1:
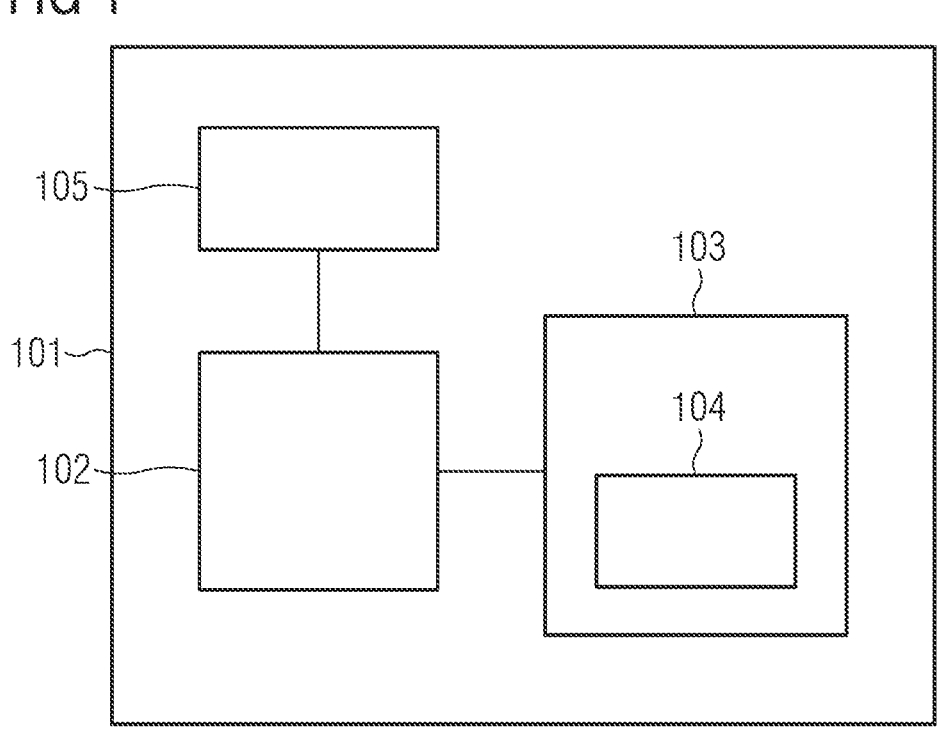
FIG. 1 shows a first embodiment.

FIG. 1 shows one sample structure for computer-implementation of embodiments of the invention which comprises:

(101) computer system
(102) processor
(103) memory
(104) computer program (product)
(105) user interface In this embodiment of the invention the computer program 104 comprises program instructions for carrying out embodiments of the invention. The computer program 104 is stored in the memory 103 which renders, among others, the memory 103 and/or its related computer system 101 a provisioning device for the computer program 104. The computer system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

Figure 2:
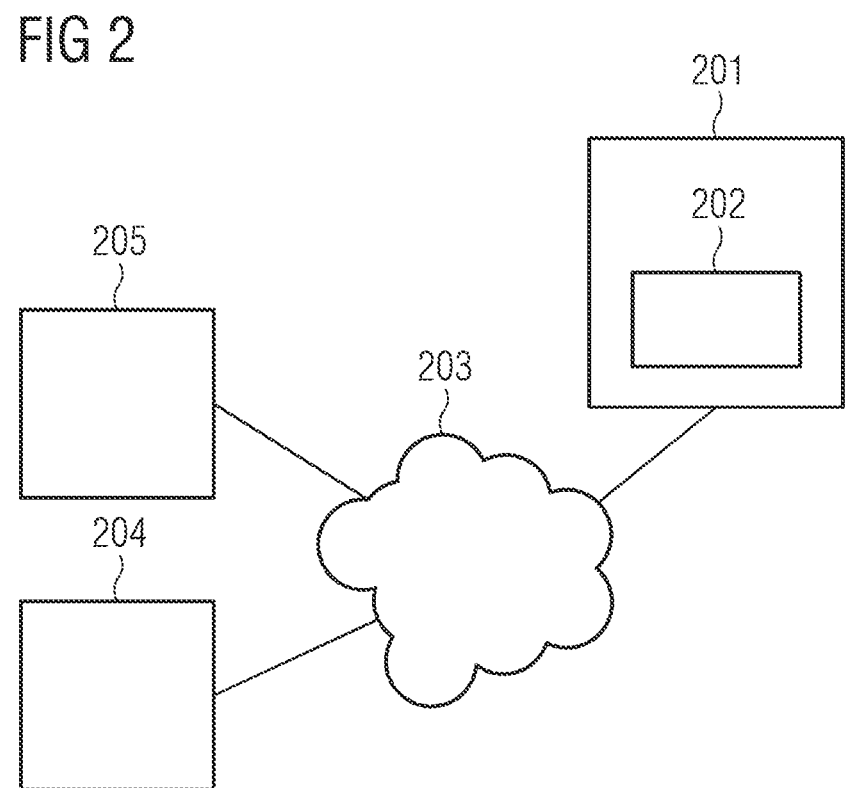
FIG. 2 shows another embodiment.

FIG. 2 shows another sample structure for computer-implementation of embodiments of the invention which comprises:

(201) provisioning device
(202) computer program (product)
(203) computer network/Internet
(204) computer system
(205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

In a variation of this embodiment, the provisioning device 201 is a computer-readable storage medium, for example a SD card, that stores the computer program 202 and is connected directly to the computer system 204 or the mobile device/smartphone 205 in order for it to load the computer program 202 and carry out embodiments of the invention by executing the program instructions of the computer program 202.

For example, the embodiments shown in FIGS. 3 to 9 can be implemented with a structure as shown in FIG. 1 or FIG. 2.

At least some of the embodiments described in the following use natural language processing and neural networks to recognise an intended database update action which is expressed in a text document, for example a support request, and to convert that text document into a machine-readable, structured form. One of the embodiments receives the text document, automatically determines the intended database update action, and executes the action through an interface to a backend system, for example through a robotic process automation connection.

Figure 3:
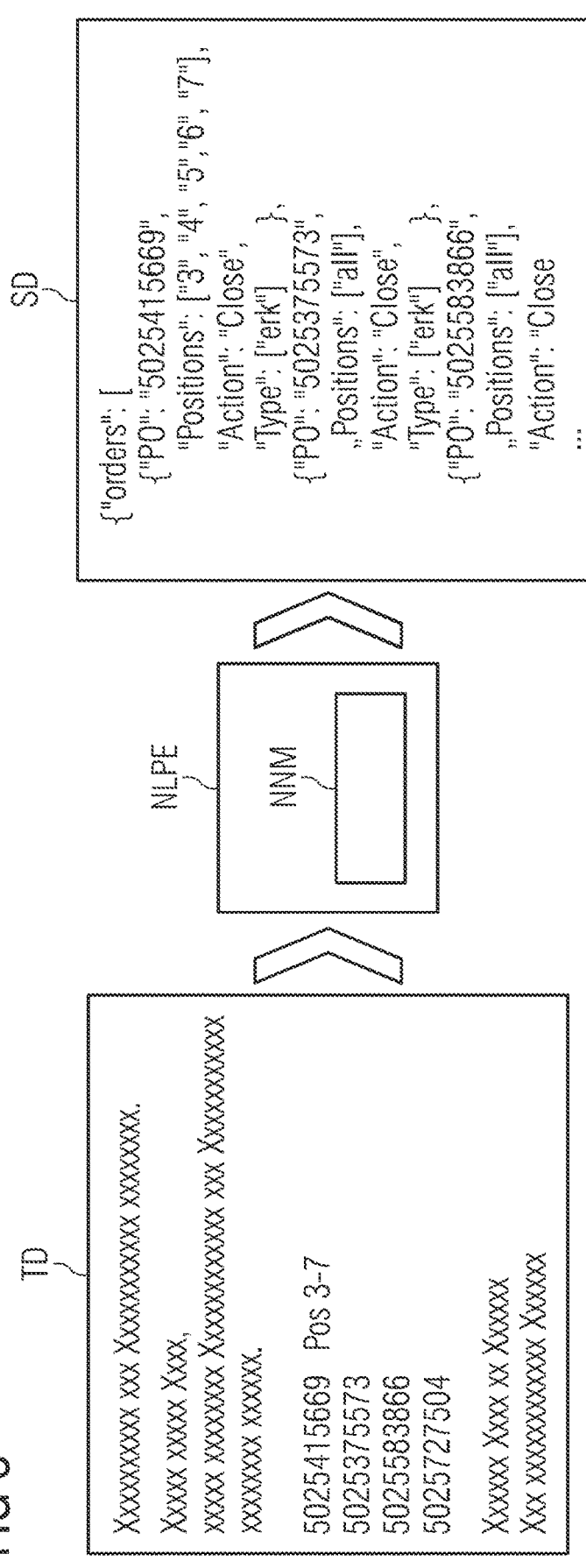
FIG. 3 shows another embodiment.

FIG. 3 shows an embodiment of a method for performing automated database updates, here with an example from the field of purchase order administration, where a database stores data related to purchase order numbers. A natural language processing engine NLPE receives a text document TD which is a service request written by a customer in the respective field, in this case accounts management. The natural language processing engine NLPE serves as an intention extraction component which uses a neural network model NNM (described below) to extract the order information regarding the intended database update action which the text document TD contains.

The database update action can be, for example, a simple database update such as changing a value from "open" to "closed". However, the database update action can also be a more complex set of actions, for example automatically generating and electronically mailing an invoice document and changing corresponding entries in the database accordingly.

The text document TD is a file or dataset containing text, but not necessarily a text file with file type TXT. It could also be an Email, for example an EML file, a word document of file type DOC or DOCX, or a chat/SMS message, to name some examples.

The result of this intention extraction phase is structured data SD containing zero or more database update actions for each one of a known anchor type, in this case a purchase order number. In the given example, the text document TD is an email asking to create invoices for four different purchase order numbers, wherein for the first purchase order number, specific positions 3-7 have been selected for the invoice. In the structured data SD, each purchase order number is listed after an identifier "PO". The term "invoice" that was contained in the text document TD is represented as "ERK" in the structured data SD, which is a domain specific type of entity denoting an action type.

Figure 4:
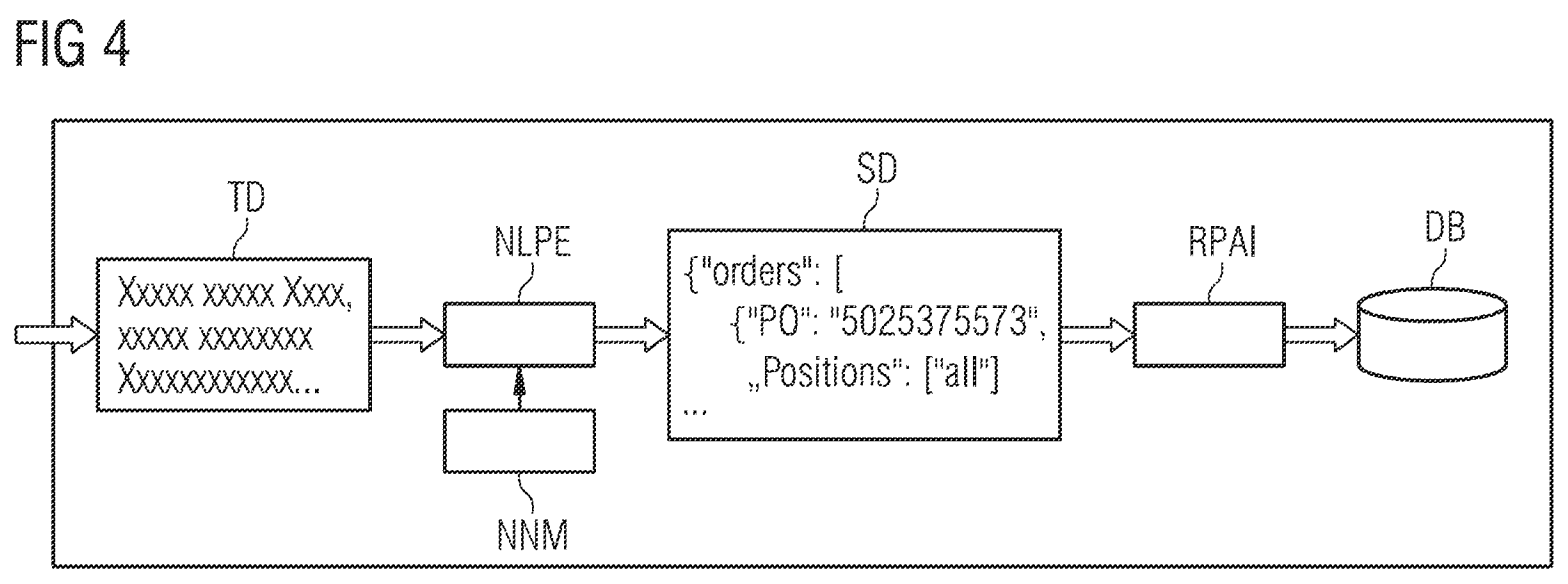

FIG. 4 shows the previously described elements as well as additional components of a system for performing automated database updates according to an embodiment that includes robotic process automation. Here, the structured data SD containing the database update action in machine-readable form is passed to a robotic process automation interface RPAI and executed in a backend, leading to an update of a database DB. The update of the database DB can relate to purchase order data, the order of a product, or the scheduling of a sales call, for example. The respective robotic process automation and database technology are state of the conventional art.

The natural language processing engine NLPE is based on the neural network model NNM, which is trainable. A more specific variant of the current embodiment differentiates between a training phase, which is a one-off process to prepare the neural network model NNM, and a runtime phase, in which new text documents, for example new support requests, are handled.

Figure 5:
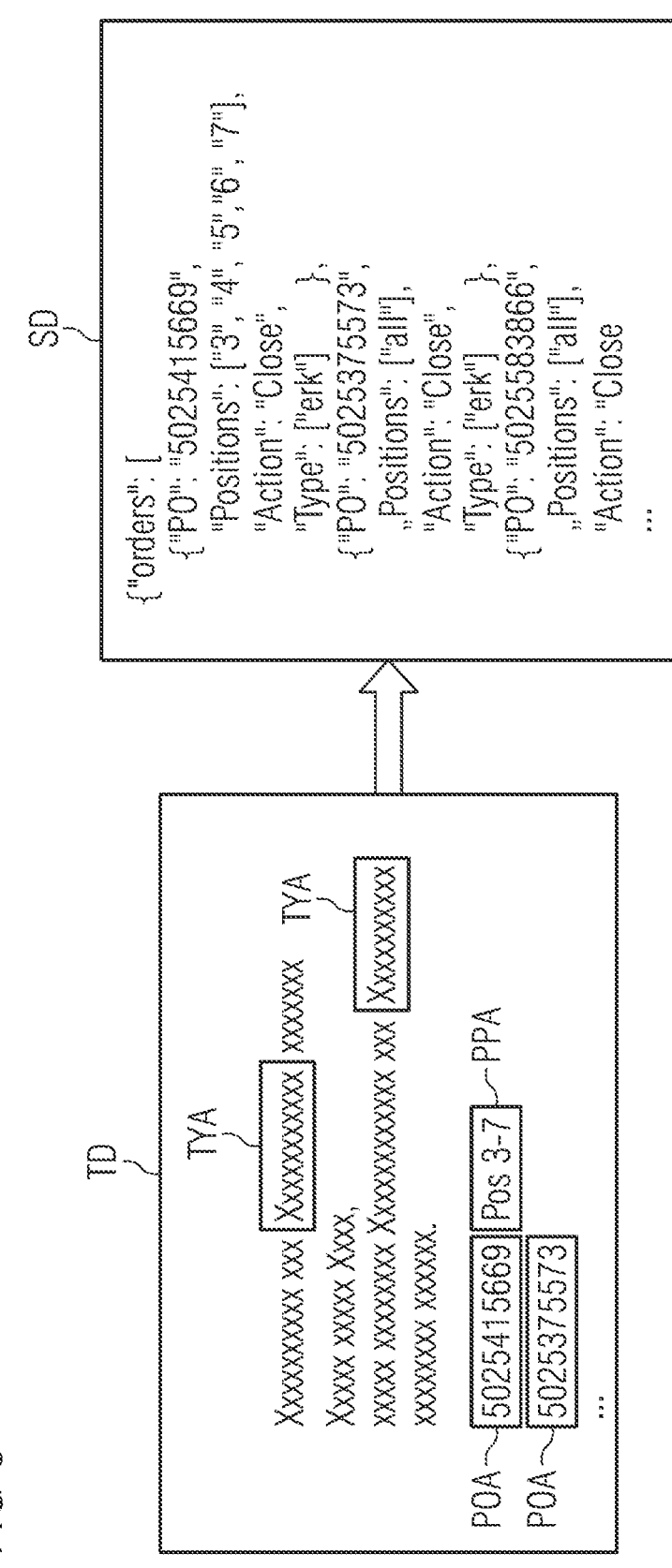
FIG. 5 shows inputs for training a neural network model NNM.

For the training phase, the current embodiment uses certain inputs, which are illustrated in FIG. 5, namely text documents TD, named entity recognition annotations, and structured data SD serving as a JSON structure label for each text document TD. In the example shown in FIG. 5, the named entity recognition annotations include action type annotations TYA marking the word "invoice" and annotating it with the domain specific type of entity "ERK", anchor annotations POA marking purchase order numbers, and a position phrase annotation PPA, marking the position phrase "Pos 3-7".

The training data is a set of sufficiently many of these text documents TD and their corresponding annotations and labels. In practice, such data is typically collected from a historical database of operations in the particular field, in this case accounts management.

The named entity recognition annotations are stored in a standard format which encodes a type and word index offset for each entity. The range of possible entities is known in advance—in this case there are three domain specific action types (ERK, ELK and WE), further domain specific types (purchase order number, position), as well as generic types, for example Person, Organisation or Location. The occurrence of domain-specific types is determined by a domain-specific named entity recognition component. In the current embodiment the domain-specific types are recognised using a set of pre-authored regular expressions. However other domain-specific NER methods could also be used, such as pre-trained statistical NER models.

The neural network model NNM shown in FIGS. 3 and 4 makes multiple predictions in parallel, each corresponding to one part of the structured data SD. In the current embodiment, two of those predictions are (with the purchase order numbers serving as anchors):

Predict a type of an action for each anchor

Predict a position list for each anchor

Figure 6:
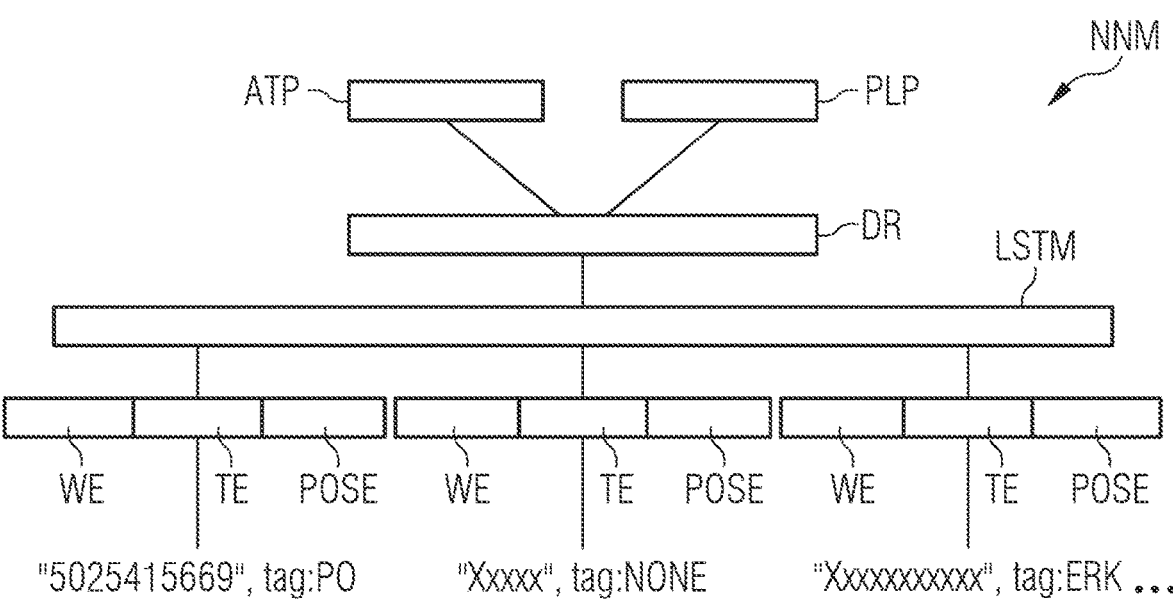
FIG. 6 shows an architecture of the neural network model NNM.

The corresponding architecture of the neural network model NNM for these predictions is shown in FIG. 6. The neural network model NNM has two outputs (the topmost layer, also referred to as "prediction heads") for the two predictions mentioned above, which are described in the following.

The first prediction head is an action type prediction ATP predicting a type of an action for each anchor, performing a multilabel prediction task with a set number of labels, since multiple action types can be associated with a single anchor. In the current embodiment, the types of an action for each purchase order number which the neural network model NNM can predict are ERK, ELK, and WE. In other words, the action type prediction TP performs a multilabel classification over the three classes ELK, ERK, and WE.

The prediction of a position list PL (shown in FIG. 8) for each purchase order number involves first finding a position phrase in the text document as a word index offset range and then parsing the position phrase with a position parser PP (also shown in FIG. 8) into the position list PL, for example in the form "[1, 2, 3]".

Returning to FIG. 6, in order to perform the first step of finding the word index offset range for the position phrase, the neural network model NNM is equipped with a second prediction head, here a position location prediction PLP that provides a categorical classification over the number of input sequence indices (e.g., 0-299) and −1 for "all".

The two predictions are made from a shared document representation DR which is generated by a single-layer long short-term memory network LSTM. In other words, the single document representation DR is used to make multiple predictions for each purchase order number.

The inputs to the neural network model NNM are a combination of three pieces of information about each token in the text document TD shown in FIGS. 3 and 5, as shown in the lower layer of the architecture depicted in FIG. 6:

A word embedding WE encodes the meaning of the word, a tag embedding TE encodes the entity which a word denotes, and a purchase order number spatial encoding POSE represents where the word is in relation to the purchase order number.

The word embedding WE is a representation of word meaning which is taken from a well-known, publicly available NLP resource such as Glove, word2vec or fasttext. This public resource is combined with a domain-specific resource containing word embeddings for in-domain concepts such as "ERK", which is specific for any given use-case.

The tag embedding TE encodes which entity a token is an instance of and includes both the domain-specific (purchase order number, action type, position) and generic entity types (Person, Location) as well as the special entity type "None".

The purchase order number spatial encoding POSE represents how far the token is from an anchor purchase order number, measured in a number of tokens. The intuition behind this input is that the neural network model NNM needs to know which purchase order number occurrences are close to which potential action type and position phrase occurrences in order to make accurate predictions. This is particularly important in text documents which contain multiple purchase order numbers, as in the example above, because the input information to the neural network model NNM for each distinct purchase order number differs only in this purchase order number spatial encoding POSE.

Figure 7:
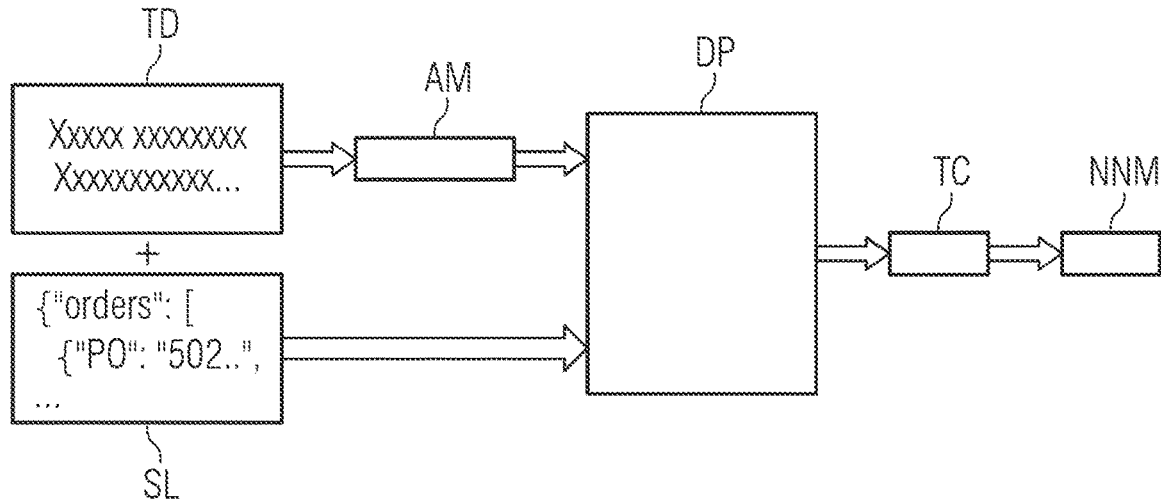
FIG. 7 shows a procedure for training the neural network model NNM.

A training phase according to the current embodiment is illustrated in FIG. 7. The input data as described above, here a set of text documents TD and corresponding JSON structure labels SL, is converted into distinct training datapoints DP, one for each purchase order number in each text document TD. The training datapoints DP contain as model inputs text tokens and purchase order number locations, and as training labels action type, position list, and position location.

In order to create the model inputs, for each training datapoint DP a corresponding purchase order number location is computed which corresponds to the token offset of the respective token within the text document TD. The text document TD is also analysed with an external, pre-trained named entity recognition annotation model AM provided by the open-source package spaCy, which is well known in natural language processing applications.

The neural network model NNM is then trained from the training data set with the datapoints DP by a training component TC according to the usual well known machine learning methods. The trained neural network model NNM is then written to persistent storage along with its metadata.

Figures 8, 9:
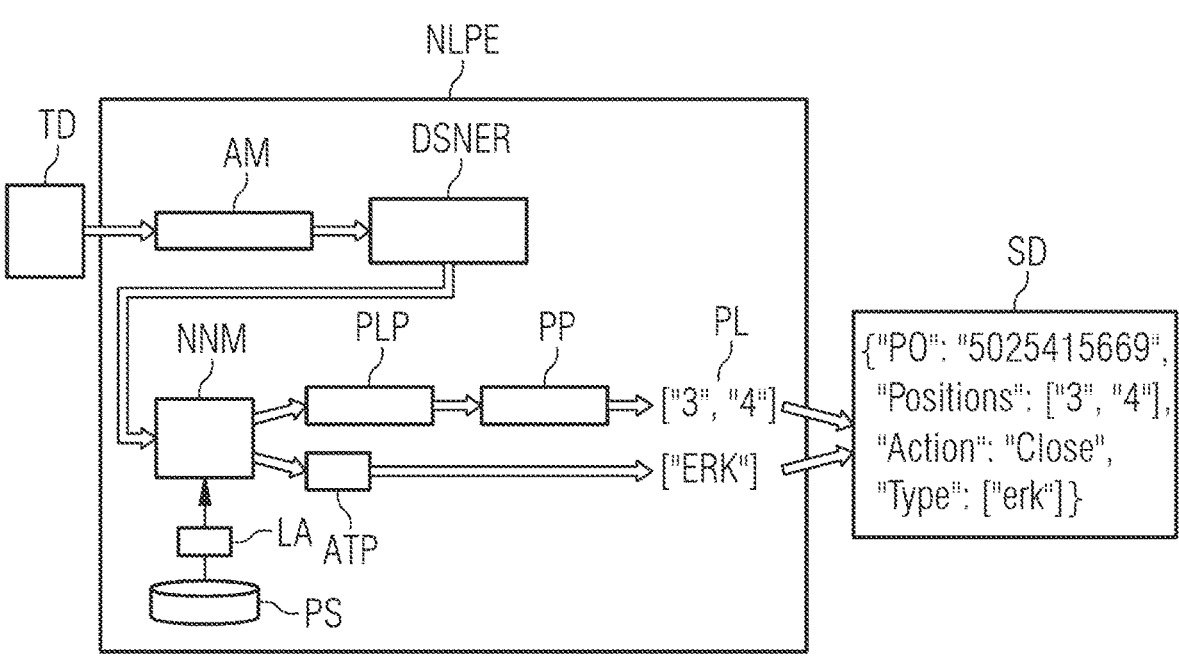
FIG. 8 shows a runtime phase for the operation of a natural language processing engine NLPE.
FIG. 9 shows a flowchart of a possible exemplary embodiment of a method for performing automated database updates.

FIG. 8 shows a runtime phase for the current embodiment, which is executed by a natural language processing engine NLPE. In this embodiment, the trained neural network model NNM is fetched in a loading operation LA from persistent storage PS and then operates as an intention extraction component. This embodiment applies the above-mentioned annotation model AM (spaCy) and domain-specific named entity recognition components DSNER to a newly received support request in the form of a text document TD in order to add the named entity recognition annotations which are required by the neural network model NNM. The text document TD has been received via email, a web form, or similar means, for example.

The neural network model NNM then makes the above-described action type prediction ATP as well as the above-described position location prediction PLP for each purchase order number in the text document TD. For each pair of these predictions, the embodiment converts the position phrase identified by the position location prediction PLP into a position list PL using a position parser PP, and then constructs the structured data SD in JSON, which is then passed to the robotic process automation interface RPAI shown in FIG. 4.

FIG. 9 shows a flowchart of a possible exemplary embodiment of a method for performing automated database updates, wherein the following operations are performed by components, and wherein the components are software components executed by one or more processors and/or hardware components.

In a receiving operation 1, a network interface receives a text document, wherein the text document describes at least one database update action in natural language.

The text document is then processed by a natural language processing engine with the following operations.

In a tagging operation 2, a pre-trained general named entity recognition annotation model and/or at least one domain-specific named entity recognition component are tagging tokens in the text document with named entity recognition annotations.

In an extracting operation 3, a neural network model processes the tokens and the named entity recognition annotations and extracts the database update action from the text document.

In a storing operation 4, the database update action is stored as structured data in a machine-readable form in a memory.

In a sending operation 5, the structured data is sent to a robotic process automation interface.

In an executing operation 6, the database update action is executed by updating a database.

In case the text document contains further database update actions, the method can resume with step 3.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for performing automated database updates, wherein the following operations are performed by components, and wherein the components are hardware components and/or software components executed by one or more processors:

receiving, by a network interface, a text document, wherein the text document describes at least one database update action in natural language, and wherein the text document contains at least one anchor, wherein the anchor is a token denoting an entity in the database that the database update action is related to;

processing, by a natural language processing engine, the text document, by way of: tagging, by a pre-trained general named entity recognition annotation model and/or at least one domain-specific named entity recognition component, tokens in the text document with named entity recognition annotations, wherein the named entity recognition annotations include at least one anchor annotation tagging the anchor and at least one action type annotation specifying a type of the database update action;

extracting, by a neural network model processing the tokens and the named entity recognition annotations, the database update action from the text document, wherein the neural network model receives as input for each token in the text document: a word embedding encoding a meaning of the token, a tag embedding encoding an entity which the token denotes, wherein the tag embedding is based on the named entity recognition annotations, and a spatial encoding representing how far the token is from the anchor in the text document, measured in a number of tokens, and wherein the neural network model comprises: a first prediction head trained for performing an action type prediction predicting an action type for the anchor by performing a multilabel prediction task with a set number of labels, and a second prediction head trained for predicting a location of a phrase relating to the anchor, wherein the first and second prediction heads make predictions from a shared document representation generated by a single-layer long short-term memory network;

storing the database update action as structured data in a machine-readable form; wherein the predicted action type and the anchor are included in the structured data in order to define the database update action;

sending the structured data to a robotic process automation interface; and executing the database update action, by the robotic process automation interface, wherein the robotic process automation interface receives the structured data containing the database update action in machine-readable form and executes the database update action in the database to automatically update a database.

2. The method according to claim 1, wherein the at least one domain-specific named entity recognition component recognizes and tags tokens in the text document using regular expressions or pre-trained statistical NER models.

3. The method according to claim 1, wherein the neural network model computes a confidence value for the database update action; and wherein the structured data is sent to the robotic process automation interface only if the confidence value exceeds a given threshold.

4. The method according to claim 1, wherein the neural network model has a third prediction head, trained for predicting a third information relating to the anchor; and wherein the third information is included in the structured data to further define the database update action.

5. The method according to claim 1, wherein the text document contains several anchors; and wherein a database update action is extracted and executed for each anchor.

6. A non-transitory computer program product, comprising a computer readable hardware storage device having computer readable program code stored therein, said program code executable by a processor of a computer system to implement a method according to claim 1.

7. A provisioning device for the computer program product according to claim 6, wherein the provisioning device is a computer-readable storage medium that stores the computer program product and is configured for a direct connection to a computer system to enable loading and execution of the computer program product.

8. A system for performing automated database updates, comprising: a network interface, configured for receiving a text document, wherein the text document describes at least one database update action in natural language, and wherein the text document contains at least one anchor, wherein the anchor is a token denoting an entity in the database that the database update action is related to;

a natural language processing engine, configured for processing the text document with:

a pre-trained general named entity recognition annotation model and/or at least one domain-specific named entity recognition component, configured for tagging tokens in the text document with named entity recognition annotations, wherein the named entity recognition annotations include at least one anchor annotation tagging the anchor and at least one action type annotation specifying a type of the database update action, a neural network model, trained for extracting the database update action from the text document, by processing the tokens and the named entity recognition annotations, wherein the neural network model is configured to receive as input for each token in the text document: a word embedding encoding a meaning of the token, a tag embedding encoding an entity which the token denotes, wherein the tag embedding is based on the named entity recognition annotations, and a spatial encoding representing how far the token is from the anchor in the text document, measured in a number of tokens, and wherein the neural network model comprises: a first prediction head trained for performing an action type prediction predicting an action type for the anchor by performing a multilabel prediction task with a set number of labels, and a second prediction head trained for predicting a location of a phrase relating to the anchor, wherein the first and second prediction heads are configured to make predictions from a shared document representation generated by a single-layer long short-term memory network, and a memory, accessible for storing the database update action as structured data in a machine-readable form; wherein the predicted action type and the anchor are included in the structured data in order to define the database update action; and a robotic process automation interface, configured for receiving the structured data and executing the database update action by automatically updating a database through the robotic process automation interface, wherein the robotic process automation interface receives the structured data containing the database update action in machine-readable form and executes the database update action in a database.

* * * * *